United States Patent
Chen et al.

(10) Patent No.: US 12,362,395 B2
(45) Date of Patent: Jul. 15, 2025

(54) PRODUCTION OF SEMI-SOLID ELECTRODES VIA ADDITION OF ELECTROLYTE TO MIXTURE OF ACTIVE MATERIAL, CONDUCTIVE MATERIAL, AND ELECTROLYTE SOLVENT

(71) Applicant: 24M Technologies, Inc., Cambridge, MA (US)

(72) Inventors: Junzheng Chen, Concord, MA (US); Landon Oakes, Cambridge, MA (US); Naoki Ota, Lexington, MA (US); Matthew Bonju Lim, Somerville, MA (US)

(73) Assignee: 24M Technologies, Inc., Cambridge, MA (US)

( * ) Notice: Subject to any disclaimer, the term of this patent is extended or adjusted under 35 U.S.C. 154(b) by 582 days.

(21) Appl. No.: 17/581,583

(22) Filed: Jan. 21, 2022

(65) Prior Publication Data
US 2022/0238923 A1   Jul. 28, 2022

Related U.S. Application Data

(60) Provisional application No. 63/140,595, filed on Jan. 22, 2021.

(51) Int. Cl.
*H01M 10/0585* (2010.01)
*H01M 4/04* (2006.01)
(Continued)

(52) U.S. Cl.
CPC ..... *H01M 10/0585* (2013.01); *H01M 4/0404* (2013.01); *H01M 10/0568* (2013.01);
(Continued)

(58) Field of Classification Search
CPC ........... H01M 10/0585; H01M 4/0404; H01M 4/0419; H01M 4/139; Y10T 29/49108
(Continued)

(56) References Cited

U.S. PATENT DOCUMENTS 8,722,226 B2   5/2014   Chiang et al.
8,722,227 B2   5/2014   Chiang et al.
(Continued)

FOREIGN PATENT DOCUMENTS

WO   WO-2012024499 A1   2/2012
WO   WO-2012088442 A2   6/2012
(Continued)

OTHER PUBLICATIONS

International Search Report and Written Opinion for International Application No. PCT/US2022/013357, mailed May 11, 2022, 12 pages.

*Primary Examiner* — Thiem D Phan
(74) *Attorney, Agent, or Firm* — Cooley LLP

(57) ABSTRACT

Embodiments described herein relate generally to semi-solid electrodes, and methods of producing the same. In some embodiments, a method of forming a semi-solid electrode can include mixing an active material, a conductive material, and an electrolyte solvent to produce a semi-solid material. The electrolyte solvent is free of electrolyte salt. The method further includes dispensing the semi-solid material onto a current collector and wetting the semi-solid material with an electrolyte solution to form the semi-solid electrode. In some embodiments, the wetting can be via spraying. In some embodiments, the electrolyte salt can have a concentration in the electrolyte solution of at least about 1 M, at least about 2 M, or at least about 3 M. In some embodiments, the solvent can include ethyl methyl carbonate (EMC), ethylene carbonate (EC), propylene carbonate (PC), dimethyl carbonate
(Continued)

(DMC), gamma-Butyrolactone (GBL), or any combination thereof.

15 Claims, 12 Drawing Sheets

(51) Int. Cl.
  *H01M 10/0568* (2010.01)
  *H01M 10/0569* (2010.01)
(52) U.S. Cl.
  CPC .............. *H01M 10/0569* (2013.01); *H01M 2300/0028* (2013.01); *Y10T 29/49108* (2015.01)
(58) Field of Classification Search
  USPC .............. 29/623.1, 592.1, 623.4, 623.5
  See application file for complete search history.

(56) References Cited

U.S. PATENT DOCUMENTS

| | | |
|---|---|---|
| 8,778,552 B2 | 7/2014 | Chiang et al. |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,509,176 B2 | 11/2016 | Carter et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,593,952 B2 | 3/2020 | Ota et al. |
| 10,601,239 B2 | 3/2020 | Taylor et al. |
| 10,637,038 B2 | 4/2020 | Zagars et al. |
| 10,734,672 B2 | 8/2020 | Chen et al. |
| 10,777,852 B2 | 9/2020 | Woodford et al. |
| 10,854,869 B2 | 12/2020 | Bazzarella et al. |
| 10,886,521 B2 | 1/2021 | Zagars et al. |
| 10,910,858 B2 | 2/2021 | Taylor et al. |
| 10,957,940 B2 | 3/2021 | Tan et al. |
| 10,964,973 B2 | 3/2021 | Tan et al. |
| 11,005,087 B2 | 5/2021 | Ota et al. |
| 11,018,365 B2 | 5/2021 | Chiang et al. |
| 11,024,903 B2 | 6/2021 | Ota et al. |
| 11,094,487 B2 | 8/2021 | Lawrence et al. |
| 11,094,976 B2 | 8/2021 | Chiang et al. |
| 11,121,437 B2 | 9/2021 | Bazzarella et al. |
| 11,139,467 B2 | 10/2021 | Zagars et al. |
| 11,145,909 B2 | 10/2021 | Chiang et al. |
| 11,309,531 B2 | 4/2022 | Slocum et al. |
| 11,342,567 B2 | 5/2022 | Chiang et al. |
| 11,394,049 B2 | 7/2022 | Tan et al. |
| 11,462,722 B2 | 10/2022 | Aranami et al. |
| 11,469,065 B2 | 10/2022 | Lawrence et al. |
| 11,476,551 B2 | 10/2022 | Tyler et al. |
| 11,552,368 B2 | 1/2023 | Holman et al. |
| 11,575,146 B2 | 2/2023 | Taylor et al. |
| 11,594,793 B2 | 2/2023 | Bazzarella et al. |
| 11,611,061 B2 | 3/2023 | Zagars et al. |
| 11,631,920 B2 | 4/2023 | Bazzarella et al. |
| 11,646,437 B2 | 5/2023 | Bazzarella et al. |
| 11,652,203 B2 | 5/2023 | Zagars et al. |
| 11,742,525 B2 | 8/2023 | Aranami et al. |
| 11,749,804 B2 | 9/2023 | Chen et al. |
| 11,757,129 B2 | 9/2023 | Tan et al. |
| 11,764,353 B2 | 9/2023 | Ota et al. |
| 11,804,595 B2 | 10/2023 | Ota et al. |
| 11,811,119 B2 | 11/2023 | Chiang et al. |
| 11,831,026 B2 | 11/2023 | Ota et al. |
| 11,855,250 B2 | 12/2023 | Taylor et al. |
| 11,876,194 B2 | 1/2024 | Chiang et al. |
| 11,888,144 B2 | 1/2024 | Slocum et al. |
| 11,909,077 B2 | 2/2024 | Chiang et al. |
| 11,942,654 B2 | 3/2024 | Bazzarella et al. |
| 11,984,564 B1 | 5/2024 | Chen |
| 12,009,551 B2 | 6/2024 | Bazzarella et al. |
| 12,068,445 B2 | 8/2024 | Bazzarella et al. |
| 12,068,486 B2 | 8/2024 | Lawrence et al. |
| 2010/0104817 A1 | 4/2010 | Carlson |
| 2011/0189520 A1 | 8/2011 | Carter et al. |
| 2011/0200848 A1 | 8/2011 | Chiang et al. |
| 2011/0228385 A1 | 9/2011 | Avison et al. |
| 2012/0050848 A1 | 3/2012 | Carlson et al. |
| 2012/0069429 A1 | 3/2012 | Barrett et al. |
| 2012/0135257 A1 | 5/2012 | Carlson et al. |
| 2012/0164499 A1 | 6/2012 | Chiang et al. |
| 2013/0309547 A1 | 11/2013 | Bazzarella et al. |
| 2013/0337319 A1 | 12/2013 | Doherty et al. |
| 2013/0344367 A1 | 12/2013 | Chiang et al. |
| 2014/0004437 A1 | 1/2014 | Slocum et al. |
| 2014/0030623 A1 | 1/2014 | Chiang et al. |
| 2014/0039710 A1 | 2/2014 | Carter et al. |
| 2014/0154546 A1 | 6/2014 | Carter et al. |
| 2014/0248521 A1 | 9/2014 | Chiang et al. |
| 2014/0315097 A1 | 10/2014 | Tan et al. |
| 2015/0024279 A1 | 1/2015 | Tan et al. |
| 2015/0129081 A1 | 5/2015 | Chiang et al. |
| 2015/0140371 A1 | 5/2015 | Slocum |
| 2015/0171406 A1 | 6/2015 | Bazzarella et al. |
| 2015/0280267 A1 | 10/2015 | Chiang et al. |
| 2015/0295272 A1 | 10/2015 | Chiang et al. |
| 2016/0013507 A1 | 1/2016 | Chiang et al. |
| 2016/0056490 A1* | 2/2016 | Chiang .................. H01M 4/62 429/104 |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0098857 A1 | 4/2017 | Carlson et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |

(56) References Cited

U.S. PATENT DOCUMENTS

| | | |
|---|---|---|
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0161688 A1 | 5/2020 | Chiang et al. |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0321597 A1 | 10/2020 | Zagars et al. |
| 2020/0321601 A1 | 10/2020 | Slocum et al. |
| 2020/0358129 A1 | 11/2020 | Chen et al. |
| 2020/0395583 A1 | 12/2020 | Carlson et al. |
| 2020/0411825 A1 | 12/2020 | Bazzarella et al. |
| 2021/0008789 A1* | 1/2021 | Wei .................. H01M 4/625 |
| 2021/0091366 A1 | 3/2021 | Bazzarella et al. |
| 2021/0167351 A1 | 6/2021 | Zagars et al. |
| 2021/0226192 A1 | 7/2021 | Aranami et al. |
| 2021/0249678 A1 | 8/2021 | Chiang et al. |
| 2021/0249695 A1 | 8/2021 | Aranami et al. |
| 2021/0265631 A1 | 8/2021 | Chen et al. |
| 2021/0296733 A1 | 9/2021 | Carlson et al. |
| 2021/0359527 A1 | 11/2021 | Taylor et al. |
| 2021/0376380 A1 | 12/2021 | Tan et al. |
| 2021/0384516 A1 | 12/2021 | Lawrence et al. |
| 2022/0021019 A1 | 1/2022 | Tan et al. |
| 2022/0029207 A1 | 1/2022 | Chiang et al. |
| 2022/0037749 A1 | 2/2022 | Bazzarella et al. |
| 2022/0052403 A1 | 2/2022 | Chen et al. |
| 2022/0077445 A1 | 3/2022 | Ota et al. |
| 2022/0085440 A1 | 3/2022 | Ota et al. |
| 2022/0093929 A1 | 3/2022 | Chen et al. |
| 2022/0115710 A1 | 4/2022 | Zagars et al. |
| 2022/0172916 A1 | 6/2022 | Lawrence et al. |
| 2022/0173446 A1 | 6/2022 | Chiang et al. |
| 2022/0200306 A1 | 6/2022 | Kusachi et al. |
| 2022/0231274 A1 | 7/2022 | Zagars et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0285669 A1 | 9/2022 | Doherty et al. |
| 2022/0344775 A1 | 10/2022 | Carlson et al. |
| 2022/0344776 A1 | 10/2022 | Carlson |
| 2022/0352597 A1 | 11/2022 | Chen et al. |
| 2022/0352598 A1 | 11/2022 | Avison et al. |
| 2023/0018078 A1 | 1/2023 | Slocum et al. |
| 2023/0022329 A1 | 1/2023 | Chen et al. |
| 2023/0085181 A1 | 3/2023 | Tan et al. |
| 2023/0090853 A1 | 3/2023 | Tyler et al. |
| 2023/0098274 A1 | 3/2023 | Carlson et al. |
| 2023/0118961 A1 | 4/2023 | Chen et al. |
| 2023/0133464 A1 | 5/2023 | Ota et al. |
| 2023/0170169 A1 | 6/2023 | Lawrence et al. |
| 2023/0178707 A1 | 6/2023 | Aranami et al. |
| 2023/0238562 A1 | 7/2023 | Kusachi et al. |
| 2023/0282906 A1 | 9/2023 | Chen et al. |
| 2023/0291063 A1 | 9/2023 | Holman et al. |
| 2023/0307803 A1 | 9/2023 | Bazzarella et al. |
| 2023/0327068 A1 | 10/2023 | Tyler et al. |
| 2023/0327077 A1 | 10/2023 | Zagars et al. |
| 2023/0327178 A1 | 10/2023 | Taylor et al. |
| 2023/0335748 A1 | 10/2023 | Chen et al. |
| 2023/0352755 A1 | 11/2023 | Aragon et al. |
| 2023/0369603 A1 | 11/2023 | Ota et al. |
| 2023/0369719 A1 | 11/2023 | Bazzarella et al. |
| 2023/0378512 A1 | 11/2023 | Bazzarella et al. |
| 2023/0395771 A1 | 12/2023 | Zagars et al. |
| 2023/0411695 A1 | 12/2023 | Narita et al. |
| 2024/0039001 A1 | 2/2024 | Kusachi et al. |
| 2024/0039120 A1 | 2/2024 | Carlson |
| 2024/0047689 A1 | 2/2024 | Hartzog et al. |
| 2024/0047772 A1 | 2/2024 | Hartzog et al. |
| 2024/0055702 A1 | 2/2024 | Ota et al. |
| 2024/0063417 A1 | 2/2024 | Chiang et al. |
| 2024/0079647 A1 | 3/2024 | Tan et al. |
| 2024/0088355 A1 | 3/2024 | Ota et al. |
| 2024/0106003 A1 | 3/2024 | Aranami et al. |
| 2024/0234705 A1 | 7/2024 | Ota et al. |
| 2024/0274855 A1 | 8/2024 | Chiang et al. |
| 2024/0274864 A1 | 8/2024 | Taylor |

FOREIGN PATENT DOCUMENTS

| | | |
|---|---|---|
| WO | WO-2020014268 A1 | 1/2020 |
| WO | WO-2022159733 A1 | 7/2022 |

\* cited by examiner

```
┌─────────────────────────────────────────────────┐
│ Mixing an active material, a conductive material, and │
│ an electrolyte solvent to produce a semi-solid  │
│                   material                      │
│                      11                         │
└─────────────────────────────────────────────────┘
                         │
                         ▼
┌─────────────────────────────────────────────────┐
│ Dispensing the semi-solid material onto a current│
│                  collector                      │
│                      12                         │
└─────────────────────────────────────────────────┘
                         │
                         ▼
┌─────────────────────────────────────────────────┐
│ Removing at least a portion of the electrolyte solvent│
│           from the semi-solid material          │
│                      13                         │
└─────────────────────────────────────────────────┘
                         │
                         ▼
┌─────────────────────────────────────────────────┐
│ Wetting the semi-solid material with an electrolyte│
│     solution to form a semi-solid electrode     │
│                      14                         │
└─────────────────────────────────────────────────┘
                         │
                         ▼
┌─────────────────────────────────────────────────┐
│ Forming an electrochemical cell with the semi-solid│
│ electrode, an additional electrode, and a separator│
│                      15                         │
└─────────────────────────────────────────────────┘
```

FIG. 1

PRODUCTION OF SEMI-SOLID ELECTRODES VIA ADDITION OF ELECTROLYTE TO MIXTURE OF ACTIVE MATERIAL, CONDUCTIVE MATERIAL, AND ELECTROLYTE SOLVENT

CROSS REFERENCE TO RELATED APPLICATIONS

This application claims the benefit of U.S. Provisional Application No. 63/140,595, titled, "Production of Semi-Solid Electrodes via Addition of Electrolyte to Mixture of Active Material, Conductive Material, And Electrolyte Solvent," and filed Jan. 22, 2021, the content of which is incorporated herein by reference in its entirety.

TECHNICAL FIELD

Embodiments described herein relate generally to semi-solid electrodes, and methods of producing the same.

BACKGROUND

Battery manufacturing methods typically include coating a conductive substrate (i.e., a current collector) with a slurry that includes an active material, a conductive additive, and a binding agent dissolved or dispersed in a solvent. After the slurry is coated onto the metallic substrate, the slurry is dried (e.g., by evaporating the solvent) and calendered to a specified thickness. The manufacture of battery electrodes can also commonly include material mixing, casting, calendering, drying, slitting, and working (e.g., bending, rolling, etc.) according to the battery architecture being built. Because the electrode is manipulated during assembly, and to ensure conductive networks are in place, all components are compressed into a cohesive assembly, for example, by use of the binding agent.

SUMMARY

Embodiments described herein relate generally to semi-solid electrodes, and methods of producing the same. In some embodiments, a method of forming a semi-solid electrode can include mixing an active material, a conductive material, and an electrolyte solvent to form a semi-solid material. The electrolyte solvent is free of electrolyte salt. The method further includes dispensing the semi-solid material onto a current collector and wetting the semi-solid material with an electrolyte solution to form the semi-solid electrode. In some embodiments, the electrolyte solution is a concentrated electrolyte solution. In some embodiments, the wetting can be via spraying. In some embodiments, the electrolyte salt can have a concentration in the electrolyte solution of at least about 1 M, at least about 2 M, or at least about 3 M. In some embodiments, the solvent can include ethyl methyl carbonate (EMC), ethylene carbonate (EC), propylene carbonate (PC), dimethyl carbonate (DMC), gamma-Butyrolactone (GBL), or any combination thereof. In some embodiments, the electrolyte salt includes at least one of lithium bis(fluorosulfonyl)imide (LiFSI) and lithium hexafluorophosphate ($LiPF_6$).

BRIEF DESCRIPTION OF THE DRAWINGS

FIG. 1 is a block diagram of a method for producing a semi-solid electrode, according to an embodiment.

DETAILED DESCRIPTION

Figure 2A:
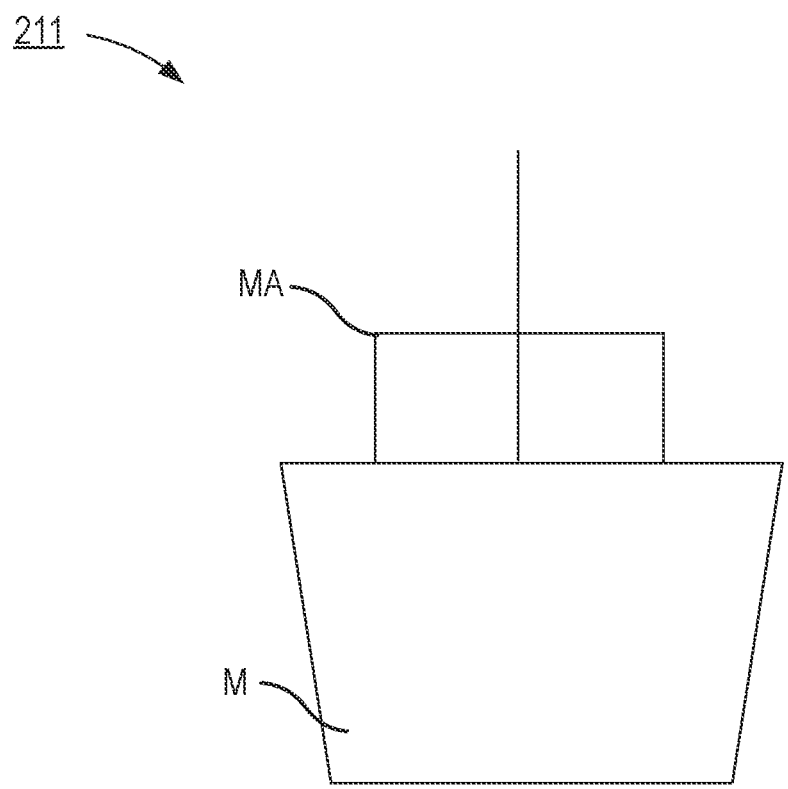
FIGS. 2A-2E are illustrations of a method for producing a semi-solid electrode, according to an embodiment.

Embodiments described herein relate generally to semi-solid electrodes, and methods of producing the same. In some embodiments, the semi-solid electrodes described herein can include a semi-solid cathode. In some embodiments, the semi-solid electrodes described herein can include an anode. In some embodiments, the semi-solid electrodes described herein can be incorporated into an electrochemical cell. Methods described herein include mixing an active material with a conductive material in an electrolyte solvent to produce a semi-solid material. The electrolyte solvent is free of electrolyte salt or substantially free of electrolyte salt.

By wetting the semi-solid material with an electrolyte solution after the production of the semi-solid material, several aspects of the performance of the semi-solid electrode can be improved. First, exposure of active material to electrolyte salt during electrode production can lead to decomposition of the active material and/or degradation of quality of the electroactive material. This can be particularly problematic with $LiPF_6$ as a salt. By minimizing the amount of time the active material is in contact with the electrolyte salt, degradation of active material can be substantially reduced, thereby minimizing capacity reduction and general performance degradation of the electrochemical cell. Electrolyte salts can also cause corrosion of metals, such as those found in current collectors or other metallic components of electrochemical cells. Similar to the active material, by minimizing the exposure time of the electrolyte salt to the current collectors and other metallic components of an electrochemical cell, performance degradation can be mitigated.

In addition to directly causing material degradation, electrolyte salts can also capture moisture in the form of water from ambient air. Water is particularly problematic in electrodes and electrochemical cells that incorporate non-aqueous electrolytes. Water can participate in side reactions with lithium-containing electrode materials, thereby diminishing the capacity and overall quality of the electrochemical cell. Additionally, by adding the electrolyte solvent later in the process, overpotential losses at the separator surface can be reduced. Without wishing to be bound by any particular theory, this can be due to more lithium salt concentration at the wetting surface (i.e., at the interface between the semi-solid electrode and a separator) than at the interface between the current collector and the semi-solid electrode. Adding electrolyte salt after the production of the semi-solid material can also have safety benefits. The flash point of an electrolyte solution increases with increasing salt content. Therefore, when wetting or spraying the electrolyte solution onto the semi-solid material, a higher salt concentration in the wetting or spraying liquid can increase the flash point of the wetting or spraying liquid. This increase in flash point can reduce the potential for spontaneous ignition of the electrolyte solution while spraying or wetting. In some embodiments, the flash point of the wetting or spraying liquid can be at least about 80° C., at least about 85° C., at least about 90° C., at least about 95° C., at least about 100° C., at least about 110° C., at least about 120° C., at least about 130° C., at least about 140° C., at least about 150° C., at least about 160° C., at least about 170° C., at least about 180° C., at least about 190° C., at least about 200° C., at least about 210° C., at least about 220° C., at least about 230° C., at least about 240° C., at least about 250° C., at least about 260° C., at least about 270° C., at least about 280° C., at least about 290° C., or at least about 300° C.

Additionally, adding the electrolyte salt later in the production process can ease the process of recycling active material and electrolyte solvent. Adding the salt to the semi-solid electrode material can make the semi-solid electrode material more hazardous and difficult to remove from the current collector. By delaying the addition of salt, the semi-solid material without salt is recyclable for a longer portion of the production process.

Semi-solid electrodes described herein can be made: (i) thicker (e.g., greater than 100 μm-up to 2,000 μm or even greater) due to the reduced tortuosity and higher electronic conductivity of the semi-solid electrode, (ii) with higher loadings of active materials, and (iii) with a simplified manufacturing process utilizing less equipment. These relatively thick semi-solid electrodes decrease the volume, mass and cost contributions of inactive components with respect to active components, thereby enhancing the commercial appeal of batteries made with the semi-solid electrodes. In some embodiments, the semi-solid electrodes described herein are binderless and/or do not use binders that are used in conventional battery manufacturing. Instead, the volume of the electrode normally occupied by binders in conventional electrodes, is now occupied by: 1) electrolyte, which has the effect of decreasing tortuosity and increasing the total salt available for ion diffusion, thereby countering the salt depletion effects typical of thick conventional electrodes when used at high rate, 2) active material, which has the effect of increasing the charge capacity of the battery, or 3) conductive additive, which has the effect of increasing the electronic conductivity of the electrode, thereby countering the high internal impedance of thick conventional electrodes. The reduced tortuosity and a higher electronic conductivity of the semi-solid electrodes described herein, results in superior rate capability and charge capacity of electrochemical cells formed from the semi-solid electrodes. Since the semi-solid electrodes described herein, can be made substantially thicker than conventional electrodes, the ratio of active materials (i.e., the semi-solid cathode and/or anode) to inactive materials (i.e., the current collector and separator) can be much higher in a battery formed from electrochemical cell stacks that include semi-solid electrodes relative to a similar battery formed form electrochemical cell stacks that include conventional electrodes. This substantially increases the overall charge capacity and energy density of a battery that includes the semi-solid electrodes described herein.

In some embodiments, the electrode materials described herein can be a flowable semi-solid or condensed liquid composition. A flowable semi-solid electrode can include a suspension of an electrochemically active material (anodic or cathodic particles or particulates), and optionally an electronically conductive material (e.g., carbon) in a non-aqueous liquid electrolyte. Said another way, the active electrode particles and conductive particles are co-suspended in an electrolyte to produce a semi-solid electrode. Examples of battery architectures utilizing semi-solid suspensions are described in International Patent Publication No. WO 2012/024499, entitled "Stationary, Fluid Redox Electrode," and International Patent Publication No. WO 2012/088442, entitled "Semi-Solid Filled Battery and Method of Manufacture," the entire disclosures of which are hereby incorporated by reference.

In some embodiments, semi-solid electrode compositions (also referred to herein as "semi-solid suspension" and/or "slurry") described herein can be mixed in a batch process e.g., with a batch mixer that can include, e.g., a high shear mixture, a planetary mixture, a centrifugal planetary mixture, a sigma mixture, a CAM mixture, and/or a roller mixture, with a specific spatial and/or temporal ordering of component addition, as described in more detail herein. In some embodiments, slurry components can be mixed in a continuous process (e.g., in an extruder), with a specific spatial and/or temporal ordering of component addition.

The mixing and forming of a semi-solid electrode generally includes: (i) raw material conveyance and/or feeding, (ii) mixing, (iii) mixed slurry conveyance, (iv) dispensing and/or extruding, and (v) forming. In some embodiments, multiple steps in the process can be performed at the same time and/or with the same piece of equipment. For example, the mixing and conveyance of the slurry can be performed at the same time with an extruder. Each step in the process can include one or more possible embodiments. For example, each step in the process can be performed manually or by any of a variety of process equipment. Each step can also include one or more sub-processes and, optionally, an inspection step to monitor process quality. Semi-solid electrode compositions and chemistries are described in greater detail in U.S. Pat. No. 8,993,159, entitled "Semi-Solid Electrodes Having High Rate Capability," filed Apr. 29, 2013 (the '159 patent), the entire disclosure of which is hereby incorporated by reference. Additional examples of compositions of semi-solid electrodes are described in U.S. Pat. No. 9,437,864 entitled "Asymmetric Battery Having a Semi-Solid Cathode and High Energy Density Anode," filed Mar. 10, 2014 (the '864 patent), the entire disclosure of which is hereby incorporated by reference.

Binding agents themselves occupy space, can add processing complexity, and can impede ionic and electronic conductivity. Production of semi-solid electrodes with little or no binder can address some of these issues. Also, producing semi-solid electrodes with active material, conductive material, and electrolytes can simplify the process of electrode and electrochemical cell production. However, several issues can arise during the production of semi-solid electrodes. For example, exposure to electrolyte salt for an extended period of time can potentially lead to electrode degradation. Electrolyte salt can also capture ambient moisture and degrade the electrode quality and energy density. Electrolyte salt can also corrode different parts of the electrochemical cell (e.g., current collectors, active material). These issues can be addressed by reducing the total exposure time of the electrolyte salt to the other electrode materials upon producing the semi-solid electrode.

In some embodiments, the semi-solid electrode can be densified. Examples of densified semi-solid electrodes and methods of manufacturing the same are described in U.S. Patent Publication No. 2021/0226192, entitled "Apparatuses and Processes for Forming a Semi-Solid Electrode Having High Active Solids Loading and Electrochemical Cells Including The Same," filed Jan. 20, 2021 (the '192 publication), the entire disclosure of which is hereby incorporated by reference. Other possible processing steps are described in U.S. patent application Ser. No. 17/498,996, entitled "Methods of Continuous and Semi-Continuous Production of Electrochemical Cells," filed Oct. 12, 2021 (the '996 application), the entire disclosure of which is hereby incorporated by reference.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the terms "about" and "approximately" generally mean plus or minus 10% of the value stated, e.g., about 250 μm would include 225 μm to 275 μm, about 1,000 μm would include 900 μm to 1,100 μm.

As used herein, the term "semi-solid" refers to a material that is a mixture of liquid and solid phases, for example, such as particle suspension, colloidal suspension, emulsion, gel, or micelle.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

FIG. 1 is a block diagram of a method 10 for producing a semi-solid electrode, according to an embodiment. The method 10 includes mixing an active material, a conductive material, and an electrolyte solvent to produce a semi-solid material at step 11 and dispensing the semi-solid material onto a current collector at step 12. In some embodiments, the active material can include silicon, tin, silicon alloys, tin alloys, aluminum, titanium oxide, lithium metal, carbon, lithium-intercalated carbon, lithium nitrides, lithium alloys and lithium alloy forming compounds of silicon, bismuth, boron, gallium, indium, zinc, tin, antimony, aluminum, titanium oxide, molybdenum, germanium, manganese, niobium, vanadium, tantalum, gold, platinum, iron, copper, chromium, nickel, cobalt, zirconium, yttrium, molybdenum oxide, germanium oxide, silicon oxide, silicon carbide, In some embodiments, the conductive material can include graphite, activated carbon, conductive carbon, Ketjen carbon, hard carbon, soft carbon, carbon nanotubes, carbon nanofibers, Nickel-Metal Hydride (NiMH), Nickel Cadmium (NiCd), lithium cobalt oxide, lithium iron phosphate (LFP), or any combination thereof. The method 10 optionally includes removing at least a portion of the electrolyte solvent from the semi-solid material at step 13. The method 10 includes wetting the semi-solid material with an electrolyte solution to form a semi-solid electrode at step 14, and optionally forming an electrochemical cell with the semi-solid electrode, an additional electrode, and a separator at step 15.

Step 11 includes mixing an active material, a conductive material, and an electrolyte solvent to produce a semi-solid material. In some embodiments, the electrolyte solvent can be free or substantially free of electrolyte salt. In some embodiments, the electrolyte solvent can include ethyl methyl carbonate (EMC), ethylene carbonate (EC), propylene carbonate (PC), dimethyl carbonate (DMC), butylene carbonate, and their chlorinated or fluorinated derivatives, vinyl derivatives, vinylene carbonate (VC), and/or a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. In some embodiments, the electrolyte solvent can include gamma-Butyrolactone (GBL), dimethoxyethane, tetrahydrofuran, 2-methyl tetrahydrofuran, 1,3-dioxolane, 1,4-dioxane, 4-methyl-1,3-dioxolane, diethyl ether, sulfolane, methylsulfolane, acetonitrile, propiononitrile, ethyl acetate, methyl propionate, ethyl propionate, dimethyl carbonate, tetraglyme, monoglyme, dioxane, or any other suitable electrolyte solvent. In some embodiments, the active material can include anode active material. In some embodiments, the active material can include cathode active material. In some embodiments, the active material can include any of the active materials described in the '864 patent. In some embodiments, the conductive material can include any of the conductive materials described in the '864 patent.

In some embodiments, a semi-solid material can include about 25% to about 70% by volume of the electrolyte solvent. In some embodiments, a semi-solid cathode can include about 30% to about 50%, or about 20% to about 40% by volume of the electrolyte solvent, inclusive of all ranges therebetween. In some embodiments, the semi-solid material can include at least about 25%, at least about 30%, at least about 35%, at least about 40%, at least about 45%, at least about 50%, at least about 55%, at least about 60%, or at least about 65% by volume of the electrolyte solvent. In some embodiments, the semi-solid material can include no more than about 70%, no more than about 65%, no more than about 60%, no more than about 55%, no more than about 50%, no more than about 45%, no more than about 40%, no more than about 35%, or no more than about 30% by volume of the electrolyte solvent. Combinations of the above-referenced volume percentages of the electrolyte solvent in the semi-solid material are also possible (e.g., at least about 25% and no more than about 70% or at least about 40% and no more than about 60%), inclusive of all values and ranges therebetween. In some embodiments, the semi-solid material can include about 25%, about 30%, about 35%, about 40%, about 45%, about 50%, about 55%, about 60%, about 65%, or about 70% by volume of the electrolyte solvent.

In some embodiments, the semi-solid material can include at least about 20%, at least about 25%, at least about 30%, at least about 35%, at least about 40%, at least about 45%, at least about 50%, at least about 55%, at least about 60%, at least about 65%, at least about 70%, or at least about 75% by volume of an active material. In some embodiments, the semi-solid material can include no more than about 80%, no more than about 75%, no more than about 70%, no more than about 65%, no more than about 60%, no more than about 55%, no more than about 50%, no more than about 45%, no more than about 40%, no more than about 35%, no more than about 30%, or no more than about 25% by volume of an active material. Combinations of the above-referenced active material percentages in the semi-solid material are also possible (e.g., at least about 20% and no more than about 80% or at least about 40% and no more than about 60%). In some embodiments, the semi-solid material can include about 20%, about 25%, about 30%, about 35%, about 40%, about 45%, about 50%, about 55%, about 60%, about 65%, about 70%, about 75%, or about 80% by volume of an active material.

In some embodiments, the semi-solid material can have a room temperature viscosity of at least about 1 Pa·s, at least about 2 Pa·s, at least about 3 Pa·s, at least about 4 Pa·s, at least about 5 Pa·s, at least about 6 Pa·s, at least about 7 Pa·s, at least about 8 Pa·s, at least about 9 Pa·s, at least about 10 Pa·s, at least about 20 Pa·s, at least about 30 Pa·s, at least about 40 Pa·s, at least about 50 Pa·s, at least about 60 Pa·s, at least about 70 Pa·s, at least about 80 Pa·s, at least about 90 Pa·s, at least about 100 Pa·s, at least about 200 Pa·s, at least about 300 Pa·s, at least about 400 Pa·s, at least about 500 Pa·s, at least about 600 Pa·s, at least about 700 Pa·s, at least about 800 Pa·s, or at least about 900 Pa·s. In some embodiments, the semi-solid material can have a room temperature viscosity of no more than about 1,000 Pa·s, no more than about 900 Pa·s, no more than about 800 Pa·s, no more than about 700 Pa·s, no more than about 600 Pa·s, no more than about 500 Pa·s, no more than about 400 Pa·s, no more than about 300 Pa·s, no more than about 200 Pa·s, no more than about 100 Pa·s, no more than about 90 Pa·s, no more than about 80 Pa·s, no more than about 70 Pa·s, no more than about 60 Pa·s, no more than about 50 Pa·s, no more than about 40 Pa·s, no more than about 30 Pa·s, no more than about 20 Pa·s, no more than about 10 Pa·s, no more than about 9 Pa·s, no more than about 8 Pa·s, no more than about 7 Pa·s, no more than about 6 Pa·s, no more than about 5 Pa·s, no more than about 4 Pa·s, no more than about 3 Pa·s, or no more than about 2 Pa·s.

Combinations of the above-referenced room temperature viscosity values are also possible (e.g., at least about 1 Pa·s and no more than about 1,000 Pa·s or at least about 200 Pa·s and no more than about 500 Pa·s), inclusive of all values and ranges therebetween. In some embodiments, the semi-solid material can have a room temperature viscosity of about 1 Pa·s, about 2 Pa·s, about 3 Pa·s, about 4 Pa·s, about 5 Pa·s, about 6 Pa·s, about 7 Pa·s, about 8 Pa·s, about 9 Pa·s, about 10 Pa·s, about 20 Pa·s, about 30 Pa·s, about 40 Pa·s, about 50 Pa·s, about 60 Pa·s, about 70 Pa·s, about 80 Pa·s, about 90 Pa·s, about 100 Pa·s, about 200 Pa·s, about 300 Pa·s, about 400 Pa·s, about 500 Pa·s, about 600 Pa·s, about 700 Pa·s, about 800 Pa·s, about 900 Pa·s, or about 1,000 Pa·s.

Step 12 includes dispensing the semi-solid material onto a current collector. In some embodiments, the dispensing can be via a dispensation mechanism. In some embodiments, the dispensing can be from a cartridge. In some embodiments, the dispensing can be through a nozzle. In some embodiments, the dispensing can be through formers to form the semi-solid material into a desired shape and control the edges of the semi-solid material. In some embodiments, the dispensing can include any of the dispensing parameters described in the '996 application.

The method 10 optionally includes step 13, in which at least a portion of the electrolyte solvent is removed from the semi-solid material. In some embodiments, the removal of at least a portion of the electrolyte solvent can increase the energy density of the semi-solid material. In other words, the semi-solid material can undergo a densification process. In some embodiments, removal of the electrolyte solvent can be via an absorbent material. In some embodiments, the densification process can include any of the processing parameters described in the '192 publication. In some embodiments, at least about 5%, at least about 10%, at least about 15%, at least about 20%, at least about 25%, at least about 30%, at least about 35%, at least about 40%, at least about 45%, at least about 50%, or at least about 55% of the electrolyte solvent can be removed from the semi-solid material. In some embodiments, no more than about 60%, no more than about 55%, no more than about 50%, no more than about 45%, no more than about 40%, no more than about 35%, no more than about 30%, no more than about 25%, no more than about 20%, no more than about 15%, or no more than about 10% of the electrolyte solvent can be removed from the semi-solid material. Combinations of the above-referenced values of the percentage of electrolyte solvent are also possible (e.g., at least about 5% and no more than about 60% or at least about 20% and no more than about 40%), inclusive of all values and ranges therebetween. In some embodiments, about 5%, about 10%, about 15%, about 20%, about 25%, about 30%, about 35%, about 40%, about 45%, about 50%, about 55%, or about 60% of the electrolyte solvent can be removed from the semi-solid material.

Step 14 includes wetting the semi-solid material with an electrolyte solution to form a semi-solid electrode. The electrolyte solution includes an electrolyte salt dissolved in an electrolyte solvent. In some embodiments, the electrolyte solvent can include any of the electrolyte solvents described above with reference to step 11. In some embodiments, the electrolyte solvent applied in step 14 can be the same or substantially similar to the electrolyte solvent applied in step 11 during the mixing. In some embodiments, the electrolyte salt can include $LiClO_4$, $LiPF_6$, $LiBF_4$, LiTFSI, LiBETI, LiBOB, Lithium difluoro(oxalato)borate (LIODFB), Lithium bis(fluorosulfonyl)imide (LiFSI), or any other appropriate electrolyte salt. In some embodiments, the electrolyte solution can be applied to the semi-solid material via spraying. In some embodiments, the electrolyte solution can be applied to the semi-solid material via injection (e.g., with a syringe), brushing, inkjet printing, slot-die dripping, or coating with diluted low loading semi-solid electrode materials (i.e., including electrolyte salt), or any other suitable means of application. In some embodiments, the electrolyte solution can be applied to the semi-solid material via contact with another component in the electrochemical cell (e.g., the separator and/or an additional electrode) containing the electrolyte solution. As an example, the semi-solid material can contact an electrode with electrolyte solution incorporated therein, and the electrolyte solution can diffuse and/or be absorbed into the semi-solid material. In some embodiments, the electrolyte solution can be applied to the semi-solid material in a tunnel. The tunnel can confine the space in which the semi-solid material is wetted, such that evaporation of electrolyte solvent is prevented. In some embodiments, the electrolyte salt can have a concentration in the electrolyte solution higher than the concentration of the electrolyte salt in the finished semi-solid electrode. In some embodiments, the higher salt concentration of the electrolyte solution is diluted as the electrolyte solution penetrates into the semi-solid material.

In some embodiments, the electrolyte salt can have a concentration in the electrolyte solution of at least about 0.5 M, at least about 1 M, at least about 1.5 M, at least about 2 M, at least about 2.5 M, at least about 3 M, at least about 3.5 M, at least about 4 M, at least about 4.5 M, at least about 5 M, at least about 5.5 M, at least about 6 M, at least about 6.5 M, at least about 7 M, at least about 7.5 M, at least about 8 M, at least about 8.5 M, at least about 9 M, or at least about 9.5 M. In some embodiments, the electrolyte salt can have a concentration in the electrolyte solution of no more than about 10 M, no more than about 9.5 M, no more than about 9 M, no more than about 8.5 M, no more than about 8 M, no more than about 7.5 M, no more than about 7 M, no more than about 6.5 M, no more than about 6 M, no more than about 5.5 M, no more than about 5 M, no more than about 4.5 M, no more than about 4 M, no more than about 3.5 M, no more than about 3 M, no more than about 2.5 M, no more than about 2 M, no more than about 1.5 M, no more than about 1 M, or no more than about 0.5 M. Combinations of the above-referenced electrolyte salt concentrations in the electrolyte solution are also possible (e.g., at least about 0.5 M and no more than about 10 M or at least about 2 M and no more than about 5 M), inclusive of all values and ranges therebetween. In some embodiments, the electrolyte salt can have a concentration in the electrolyte solution of about 0.5 M, about 1 M, about 1.5 M, about 2 M, about 2.5 M, about 3 M, about 3.5 M, about 4 M, about 4.5 M, about 5 M, about 5.5 M, about 6 M, about 6.5 M, about 7 M, about 7.5 M, about 8 M, about 8.5 M, about 9 M, about 9.5 M, or about 10 M. In some embodiments, pure electrolyte salt can be added to the semi-solid material at step 14. In some embodiments, pure electrolyte salt can be added to the semi-solid material as a powder at step 14. In some embodiments, the method 10 can include mixing the semi-solid material with the electrolyte solution after the addition of the electrolyte solution. In other words, the semi-solid electrode can be formed from mixing the semi-solid material and the electrolyte solution together.

The method 10 optionally includes forming an electrochemical cell with the semi-solid electrode, an additional electrode, and a separator at step 15. In some embodiments, the semi-solid electrode can be a semi-solid cathode. In some embodiments, the semi-solid electrode can be a semi-solid anode. In some embodiments, the additional electrode can include a conventional (i.e., solid) electrode. In some embodiments, the additional electrode can include an additional semi-solid electrode. The separator can be placed between the semi-solid electrode and the additional electrode to form the electrochemical cell. In some embodiments, the separator can be soaked in electrolyte solution prior to forming the electrochemical cell at step 15. In some embodiments, both the electrode and the additional electrode can include semi-solid electrodes formed in accordance with steps 11-14. In some embodiments, the cathode can include a semi-solid cathode formed in accordance with steps 11-14 while the anode can include a semi-solid anode formed from mixing electrolyte solution (i.e., including electrolyte solvent and electrolyte salt) with active material and conductive material. In some embodiments, the anode can include a semi-solid cathode formed in accordance with steps 11-14 while the cathode can include a semi-solid cathode formed from mixing electrolyte solution with active material and conductive material.

In some embodiments, the separator can be soaked in an electrolyte solution having an electrolyte salt concentration of at least about 0.5 M, at least about 1 M, at least about 1.5 M, at least about 2 M, at least about 2.5 M, at least about 3 M, at least about 3.5 M, at least about 4 M, at least about 4.5 M, at least about 5 M, at least about 5.5 M, at least about 6 M, at least about 6.5 M, at least about 7 M, at least about 7.5 M, at least about 8 M, at least about 8.5 M, at least about 9 M, or at least about 9.5 M. In some embodiments, the separator can be soaked in an electrolyte solution having an electrolyte salt concentration of no more than about 10 M, no more than about 9.5 M, no more than about 9 M, no more than about 8.5 M, no more than about 8 M, no more than about 7.5 M, no more than about 7 M, no more than about 6.5 M, no more than about 6 M, no more than about 5.5 M, no more than about 5 M, no more than about 4.5 M, no more than about 4 M, no more than about 3.5 M, no more than about 3 M, no more than about 2.5 M, no more than about 2 M, no more than about 1.5 M, no more than about 1 M, or no more than about 0.5 M. Combinations of the above-referenced electrolyte salt concentrations in the electrolyte solution where the separator soaks are also possible (e.g., at least about 0.5 M and no more than about 10 M or at least about 2 M and no more than about 5 M), inclusive of all values and ranges therebetween. In some embodiments, the separator can be soaked in an electrolyte solution having an electrolyte salt concentration of about 0.5 M, about 1 M, about 1.5 M, about 2 M, about 2.5 M, about 3 M, about 3.5 M, about 4 M, about 4.5 M, about 5 M, about 5.5 M, about 6 M, about 6.5 M, about 7 M, about 7.5 M, about 8 M, about 8.5 M, about 9 M, about 9.5 M, or about 10 M.

In some embodiments, the electrochemical cell can retain at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99% of its initial capacity after 10 cycles at a C-rate of C/10. In some embodiments, the electrochemical cell can retain at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99% of its initial capacity after 10 cycles at a C-rate of C/4. In some embodiments, the electrochemical cell can retain at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99% of its initial capacity after 10 cycles at a C-rate of C/2. In some embodiments, the electrochemical cell can retain at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99% of its initial capacity after 10 cycles at a C-rate of 1 C. In some embodiments, the electrochemical cell can retain at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99% of its initial capacity after 10 cycles at a C-rate of 2 C.

Figure 2B:
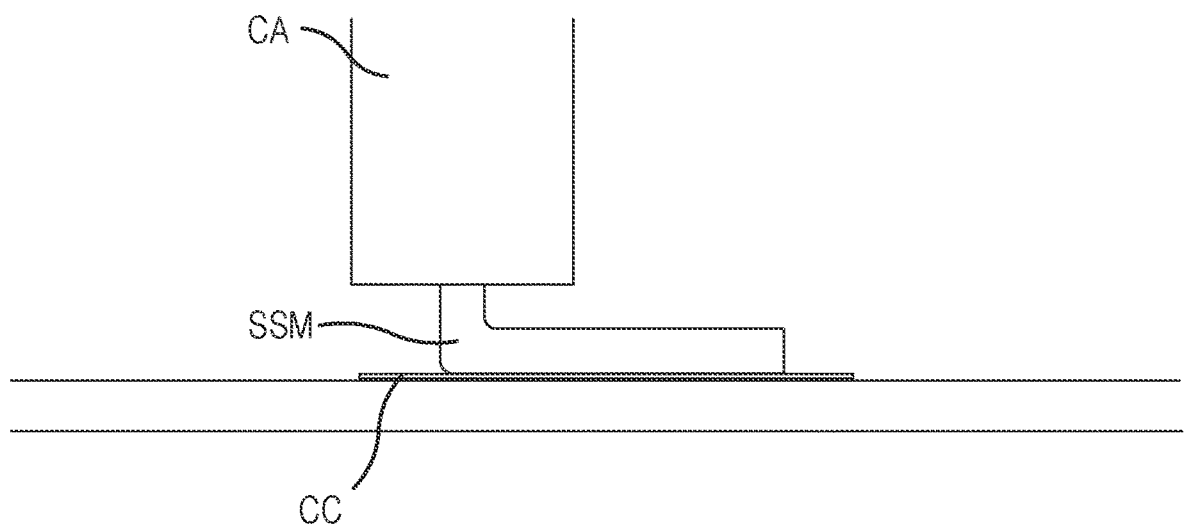
Figure 2C:
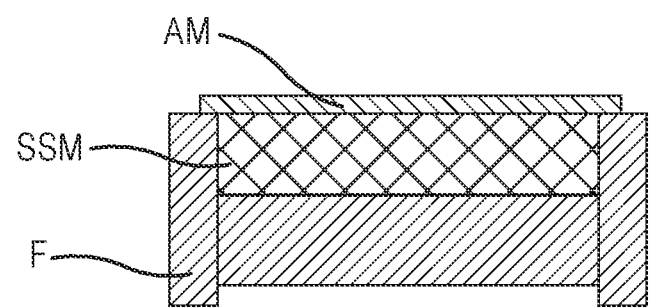
Figure 2D:
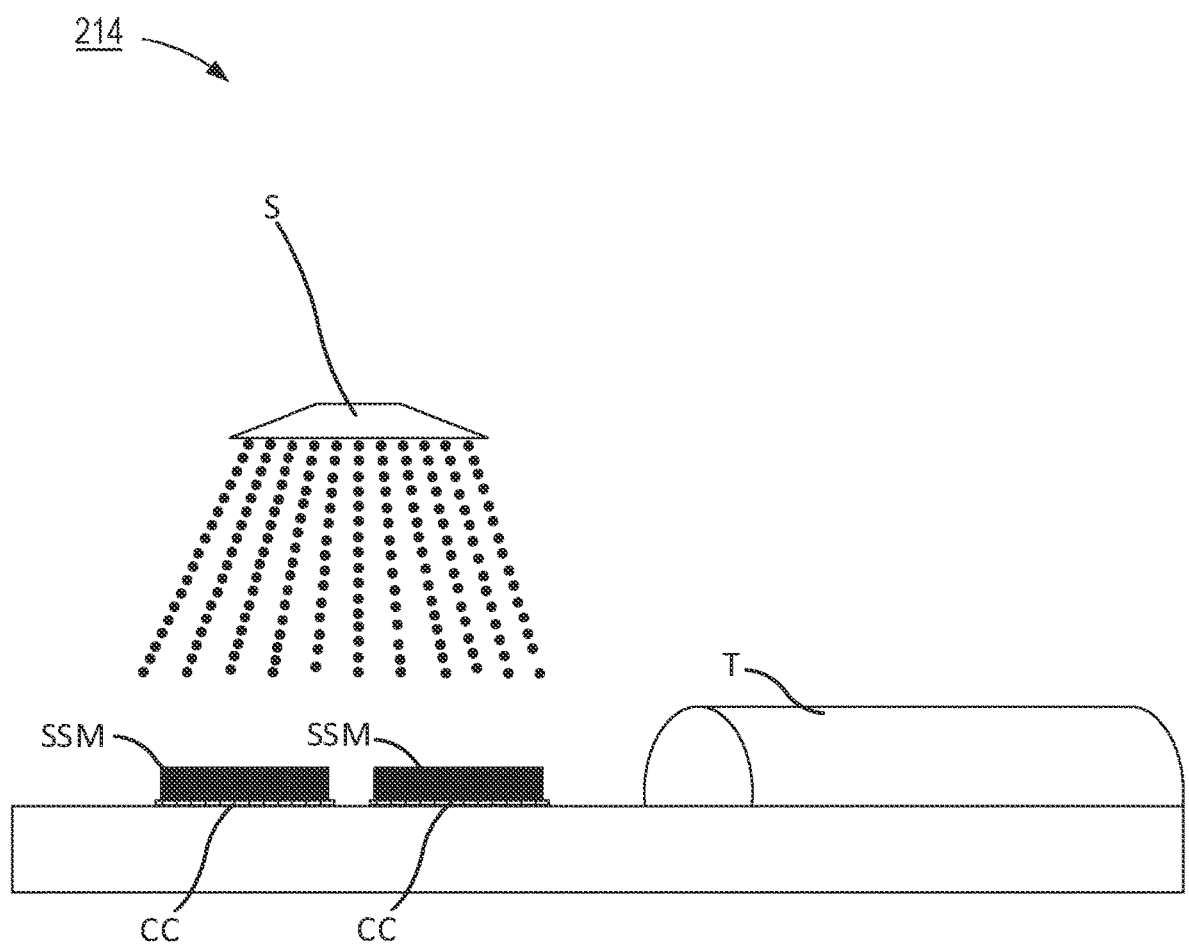
Figure 2E:
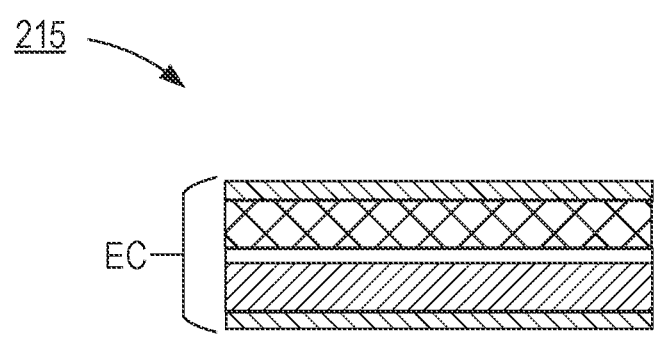

FIGS. 2A-2E are illustrations of a method for producing a semi-solid electrode, according to an embodiment. As shown, the method includes mixing an active material, a conductive material, and an electrolyte solvent to produce a semi-solid material at step 211 (as depicted in FIG. 2A) and dispensing the semi-solid material onto a current collector at step 212 (as depicted in FIG. 2B). The method optionally includes removing at least a portion of the electrolyte solvent from the semi-solid material at step 213 (as depicted in FIG. 2C). The method includes wetting the semi-solid material with an electrolyte solution to form a semi-solid electrode at step 214 (as depicted in FIG. 2D), and optionally forming an electrochemical cell with the semi-solid electrode, an additional electrode, and a separator at step 215 (as depicted in FIG. 2E). In some embodiments, the method depicted in FIGS. 2A-2E can be the same or substantially similar to the method 10, as described above with reference to FIG. 1. Thus, certain aspects of the method depicted in FIGS. 2A-2E are not described in greater detail herein.

As shown in FIG. 2A, the method includes mixing an active material, a conductive material, and an electrolyte solvent to produce a semi-solid material at step 211. A mixer M with a mixing arm MA are depicted in FIG. 2A. In some embodiments, the active material, the conductive material, and the electrolyte solvent can be added to the mixer at approximately the same time. In some embodiments, the active material, the conductive material, and the electrolyte solvent can be added to the mixer at different times.

As shown in FIG. 2B, the method includes dispensing the semi-solid material SSM onto a current collector CC at step 212. As shown, the semi-solid material SSM is dispensed from a cartridge CA. In some embodiments, the current collector CC can move along a conveyor and the cartridge CA can dispense a fixed amount of the semi-solid material SSM onto the current collector CC as the current collector CC moves under the cartridge CA.

As shown in FIG. 2C, the method includes removing at least a portion of the electrolyte solvent from the semi-solid material at step 213. As shown, the removal of the electrolyte solvent can be achieved by placing the semi-solid material SSM into a frame F with an absorbent material AM placed in contact with the semi-solid material SSM. In some embodiments, the removal of at least a portion of the electrolyte solvent can be via any of the densification methods described in the '192 publication.

As shown in FIG. 2D, the method includes wetting the semi-solid material with an electrolyte solution to form a semi-solid electrode at step 214. As shown, a sprayer S sprays electrolyte solution onto the semi-solid material SSM to form semi-solid electrodes. The semi-solid electrodes flow through a tunnel T to limit evaporation of electrolyte solvent. As shown in FIG. 2E, the method includes placing the semi-solid electrode onto an additional electrode with a separator disposed therebetween to form an electrochemical cell at step 215.

Figure 3:
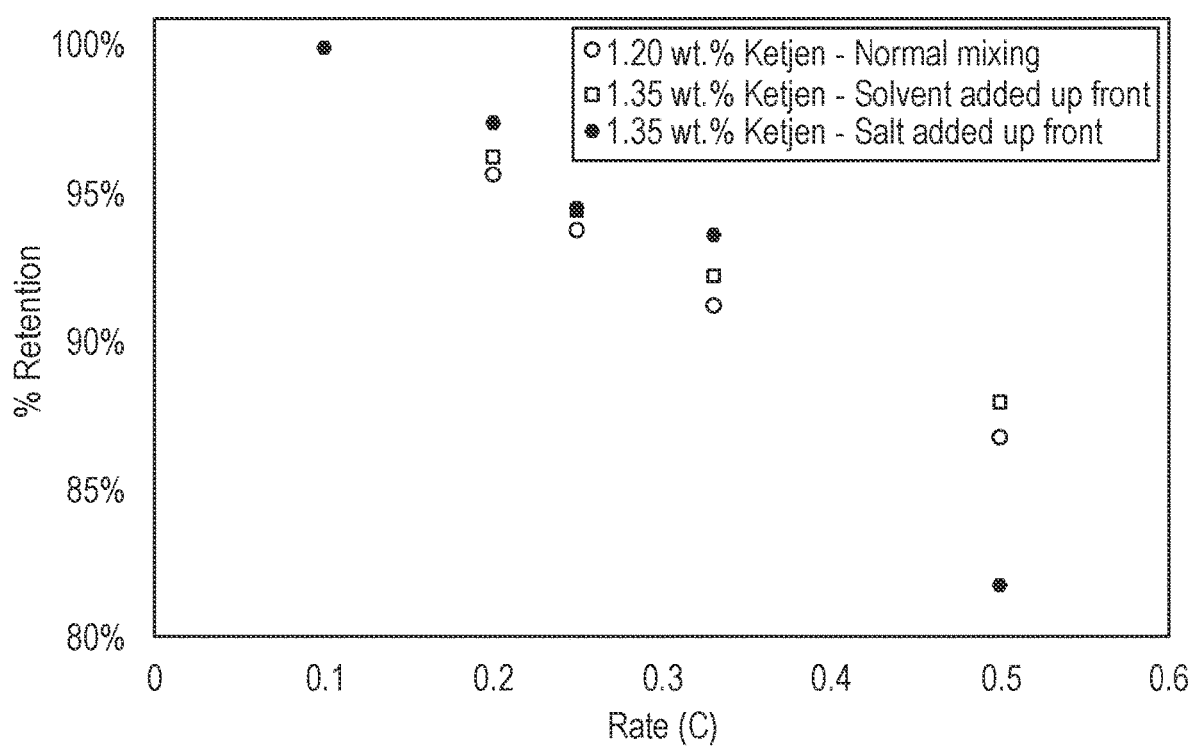
FIG. 3 is a plot of capacity retention data for electrochemical cells with electrolyte salts added at different points of the production process.

FIG. 3 is a plot of capacity retention data for electrochemical cells with electrolyte salts added at different points of the production process. As shown, electrochemical cells were produced with a 50 μm lithium anode and a 50 vol. % NMC811 semi-solid cathode. Cathode included between 1.2 wt % and 1.35 wt % Ketjen black. Electrolyte was 4M LiFSI in DME solvent. For the data labeled "solvent added up front," electrolyte solvent was mixed with active material and Ketjen to form the semi-solid cathode. The electrolyte salt was then added to the mix and the slurry was mixed again. For the data labeled "salt added up front," the electrolyte salt was added to the active material and the Ketjen. The electrolyte solvent was then added to the mix and the slurry was mixed again. For the data labeled "normal mixing conditions," the electrolyte salt was added to the electrolyte solvent to produce the electrolyte solution, and the electrolyte solution was mixed with the active material and the Ketjen to form the semi-solid cathode. As shown in the data, the cell with electrolyte solvent added up front and electrolyte salt added later has better capacity retention than a cell under normal mixing conditions or a cell with electrolyte salt added up front after discharging at 0.5 C over 5 cycles.

Figure 4A:
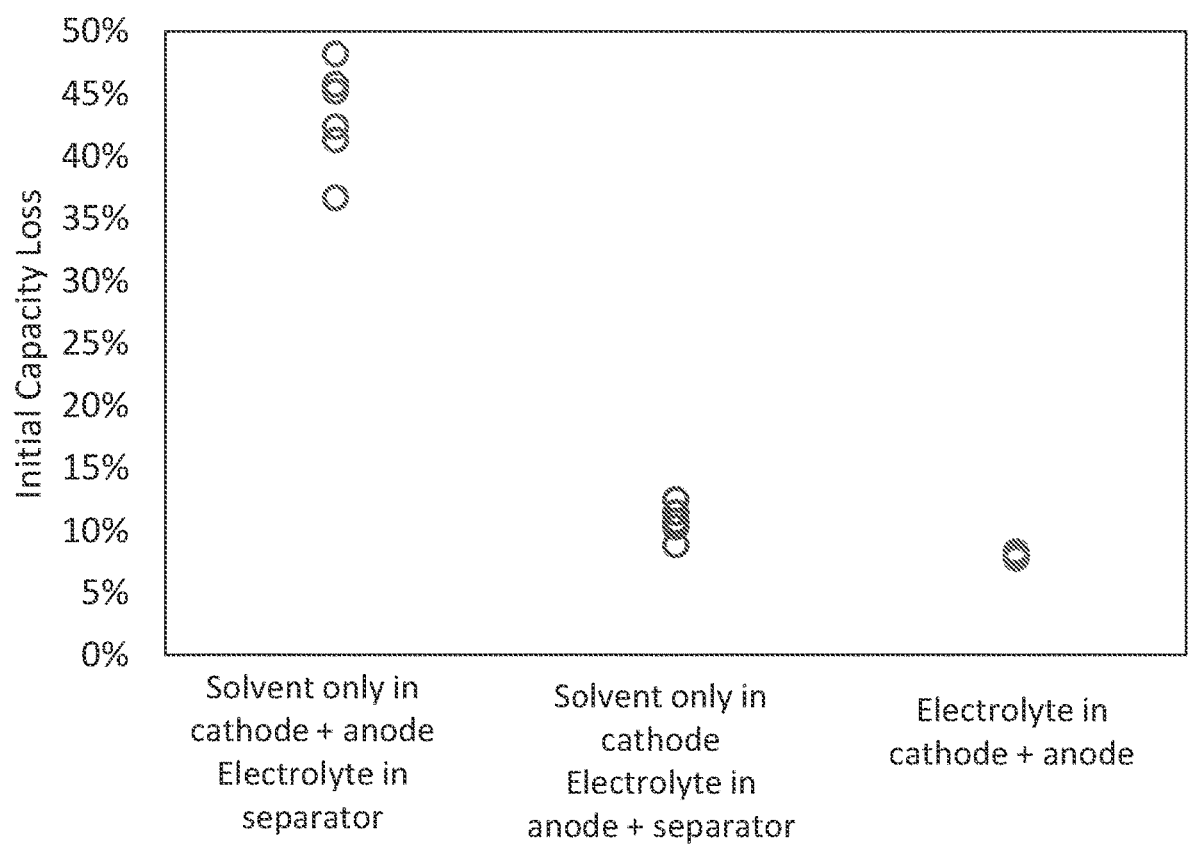
FIGS. 4A-4E are plots of initial capacity loss (ICL), direct current internal resistance (DCIR), discharge capacity, and capacity retention of electrochemical cells constructed with different electrodes pre-soaked with electrolyte solvent.
Figure 4B:
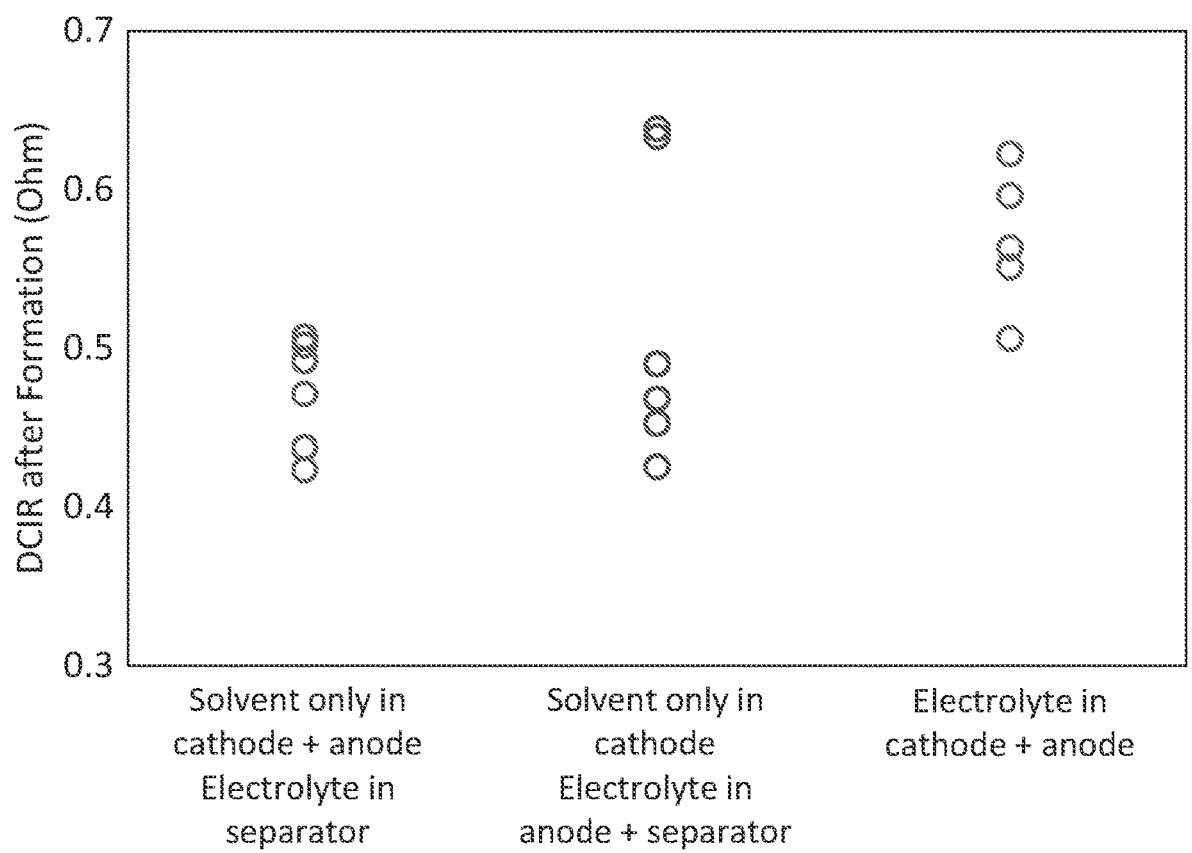
Figure 4C:
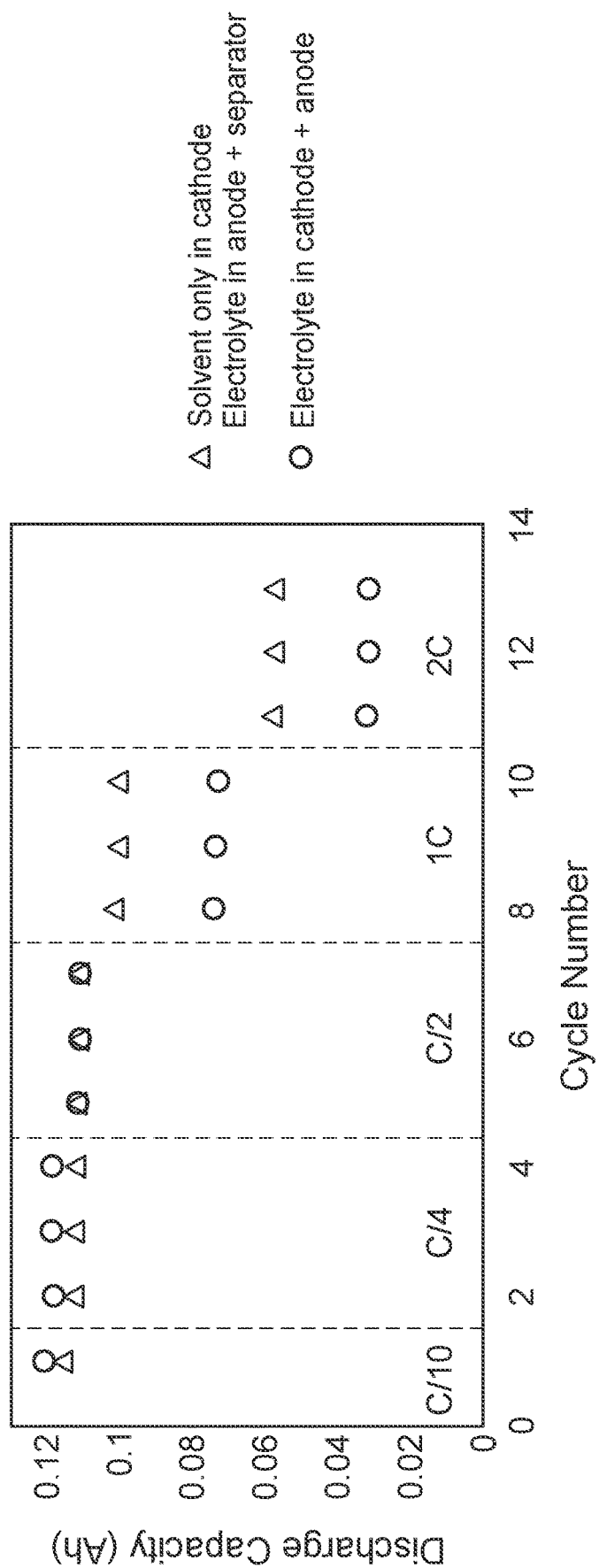
Figure 4D:
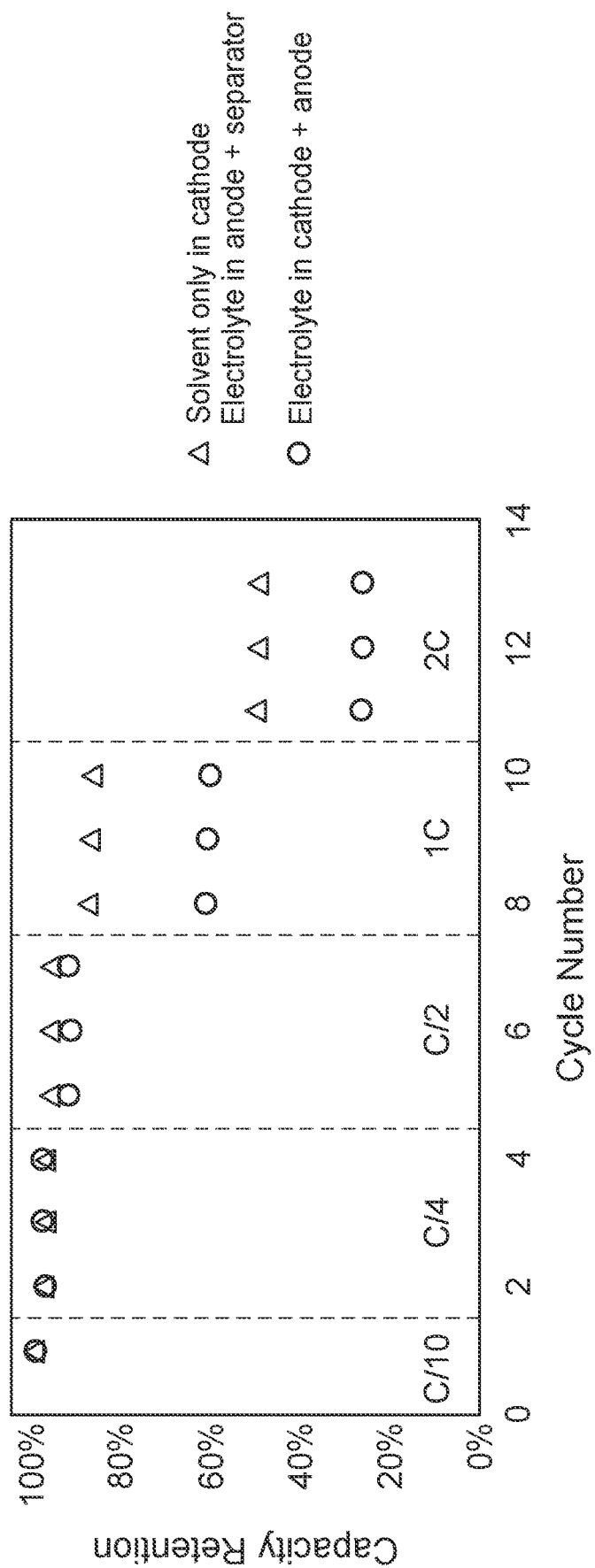
Figure 4E:
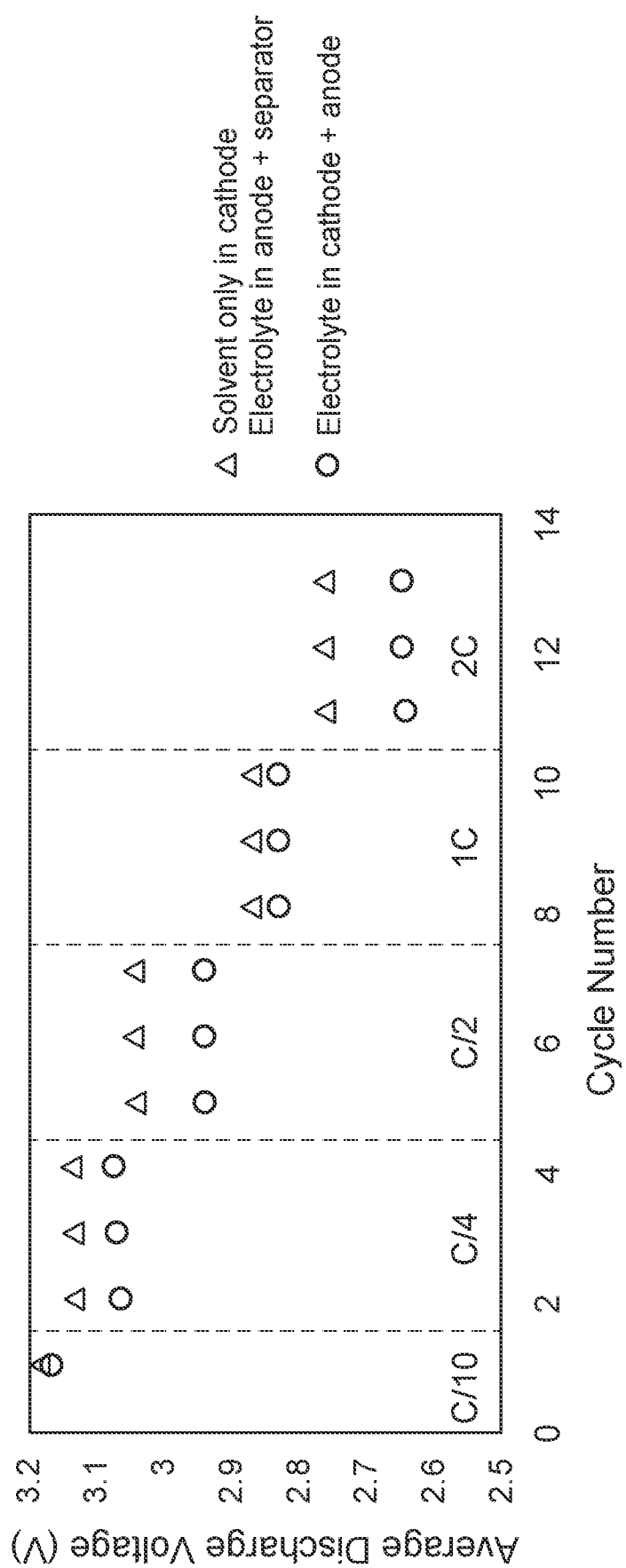

FIGS. 4A-4E are plots of ICL, DCIR, discharge capacity, and capacity retention of electrochemical cells constructed with different electrodes pre-soaked with electrolyte solvent. Each data point in FIGS. 4A-4B represents an individual cell, while each data point in FIGS. 4C-4E represents an average of three individual cells. The formation procedure included a single cycle at a charge/discharge rate of C/10, with voltage limits of 3.6 V on charge and 2.0 V on discharge, at 25° C. The ICL is the percent loss between the charge capacity and discharge capacity of the formation cycle. The leftmost data points (data set 1) on FIGS. 4A-4B include cells formed from both a cathode and an anode formed from mixing electrolyte solvent with their respective active materials and conductive materials. The separator was soaked in electrolyte solution prior to cell assembly. The middle data points (data set 2) on FIGS. 4A-4B include cells formed from a cathode formed via mixing electrolyte solvent with active material and conductive material, while the anode was formed by mixing electrolyte solution with active material and conductive material. The separator was soaked in electrolyte solution prior to cell assembly. The rightmost data points (data set 3) on FIGS. 4A-4B include cells formed from a cathode formed via mixing electrolyte solution with active material and conductive material, while the anode was formed by mixing electrolyte solution with active material and conductive material. For each of these cells, "electrolyte solvent" refers to EC/PC at a 1:1 (w:w) ratio, and "electrolyte solution" refers to 3 M LiFSI in an EC/DMC solvent at a 3:7 (w:w) ratio with 2 wt % vinylene carbonate (VC). All cells had the same volume percentages of solids (active material and carbon additive) in the cathode and anode slurries. Cathodes included 49.0 vol % LFP and 1 vol % Ketjen black. Anodes included 60.1 vol % graphite and 2.9 vol % C45 carbon black.

FIGS. 4C-4E show performance comparisons between cells from data set 2 and data set 3, as described above. The data points for each type of build represent an average of three cells. The first data point is from the formation cycle, which was performed at a charge/discharge rate of C/10. The capacity retention of a given cycle is the discharge capacity normalized to the discharge capacity of the formation cycle. Following the formation cycle, the cells underwent three cycles each at a discharge rate of C/4, C/2, 1C, and 2 C. For each cycle, the charge rate was C/4, with voltage limits of 3.6 V on charge and 2.0 V on discharge. The cycling was performed at 25° C. The cells with solvent-based cathode slurry and electrolyte-based anode slurry (data set 2) show better capacity retention at high discharge rates than the cells with electrolyte-based slurry in the cathode and anode. FIG. 4E shows average discharge voltage between data set 2 and data set 3, as described above. The cells with a solvent-based cathode slurry and an electrolyte-based anode slurry show higher average discharge voltage at all tested rates, including a higher specific energy.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method, comprising:
mixing an active material, a conductive material, and an electrolyte solvent to produce a semi-solid material, the electrolyte solvent free of electrolyte salt;
dispensing the semi-solid material onto a current collector;
incorporating an electrolyte salt into the semi-solid material to form a semi-solid electrode; and
flowing the semi-solid electrode through a tunnel to limit evaporation of the electrolyte solvent.

2. The method of claim 1 wherein the electrolyte salt is added directly to the semi-solid material as a powder.

3. The method of claim 1, wherein the electrolyte salt is added via spraying of a solution.

4. The method of claim 3, wherein the electrolyte salt has a concentration in the electrolyte solution of at least about 1 M.

5. The method of claim 3, wherein the electrolyte salt has a concentration in the electrolyte solution of at least about 2 M.

6. The method of claim 3, wherein the electrolyte salt has a concentration in the electrolyte solution of at least about 3 M.

7. The method of claim 1, wherein the electrolyte solvent includes at least one of ethyl methyl carbonate (EMC), ethylene carbonate (EC), propylene carbonate (PC), dimethyl carbonate (DMC), gamma-butyrolactone (GBL), or dimethoxyethane (DME).

8. The method of claim 1, wherein the electrolyte salt includes at least one of lithium bis(fluorosulfonyl)imide (LiFSI), Lithium bis(trifluoromethanesulfonyl)imide (LiTFSI), and lithium hexafluorophosphate ($LiPF_6$).

9. The method of claim 1, further comprising:
removing at least a portion of the electrolyte solvent from the semi-solid material to increase the energy density of the semi-solid material.

10. The method of claim 1, wherein the semi-solid electrode is a first electrode, the method further comprising:
combining the first electrode with a second electrode with a separator disposed therebetween to form an electrochemical cell.

11. The method of claim 10, further comprising:
soaking the separator in an electrolyte solution prior to forming the electrochemical cell.

12. The method of claim 1, wherein incorporating the electrolyte salt into the semi-solid material includes wetting the semi-solid material with a solution including the electrolyte salt.

13. The method of claim 1, wherein incorporating the electrolyte salt into the semi-solid material is performed subsequent to dispensing the semi-solid material onto the current collector.

14. The method of claim 1, wherein incorporating the electrolyte salt into the semi-solid material includes communicating a solution including the electrolyte salt to the semi-solid material.

15. The method of claim 1, wherein the electrolyte salt is incorporated into the semi-solid material in the tunnel.

* * * * *